US006838960B2

(12) United States Patent
Asakawa et al.

(10) Patent No.: US 6,838,960 B2
(45) Date of Patent: Jan. 4, 2005

(54) CIRCUIT BREAKER

(75) Inventors: Koji Asakawa, Saitama (JP); Hisao Kawato, Saitama (JP); Yasutoshi Ide, Saitama (JP); Hideto Yamagata, Saitama (JP); Akihiko Kohanawa, Saitama (JP)

(73) Assignee: Fuji Electric Co., Ltd., Kawasaki (JP)

( * ) Notice: Subject to any disclaimer, the term of this patent is extended or adjusted under 35 U.S.C. 154(b) by 80 days.

(21) Appl. No.: 10/360,621

(22) Filed: Feb. 10, 2003

(65) Prior Publication Data

US 2003/0169562 A1 Sep. 11, 2003

(30) Foreign Application Priority Data

Mar. 6, 2002 (JP) ....................................... 2002-060195

(51) Int. Cl.[7] .............................. H01H 9/02; H02B 1/04

(52) U.S. Cl. ......................... 335/132; 335/202; 361/673

(58) Field of Search ................................ 200/293–306; 355/132–202; 361/627–673

(56) References Cited

U.S. PATENT DOCUMENTS 5,150,091 A * 9/1992 Hart et al. .................. 335/202
5,600,291 A * 2/1997 Duchemin et al. .......... 335/132
5,811,749 A 9/1998 Bausch et al.
5,933,066 A * 8/1999 Chontas et al. ............ 335/202

FOREIGN PATENT DOCUMENTS

| | | |
|---|---|---|
| DE | 94 05 489 | 9/1992 |
| DE | 201 20 504 | 5/2002 |
| EP | 0 511 043 | 10/1992 |
| JP | 7-169355 | 7/1995 |

OTHER PUBLICATIONS

Patent Abstract of Japan, vol. 1995, No. 06, Jul. 31, 1995, Fuji Electric Co., Ltd.

Patent Abstracts of Japan, vo. 017, No. 683 (E–1477), Dec. 15, 1993.

* cited by examiner

*Primary Examiner*—James R. Scott
(74) *Attorney, Agent, or Firm*—Manabu Kanesaka

(57) ABSTRACT

A circuit breaker includes a molded case comprised of a case and a cover. Terminal parts to be connected to a power supply and a load are provided respectively at front and rear ends of the molded case. A control mechanism for switching a movable contact is disposed between the front and rear terminal parts. The cover is divided into three parts for covering the control mechanism and the terminal parts disposed at front and rear of the control mechanism, respectively. The front and rear parts of the cover covering the terminal parts are detachably mounted on the molded case as terminal covers.

6 Claims, 5 Drawing Sheets

Fig. 1(A)
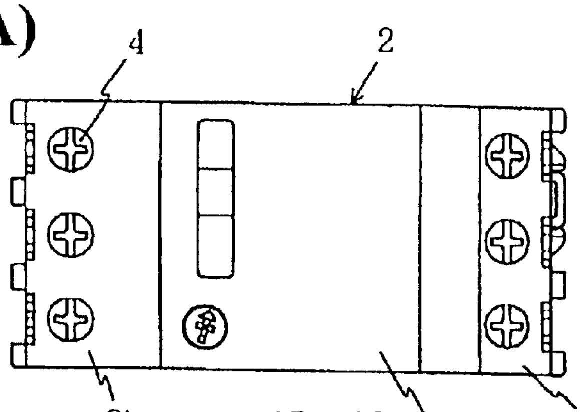
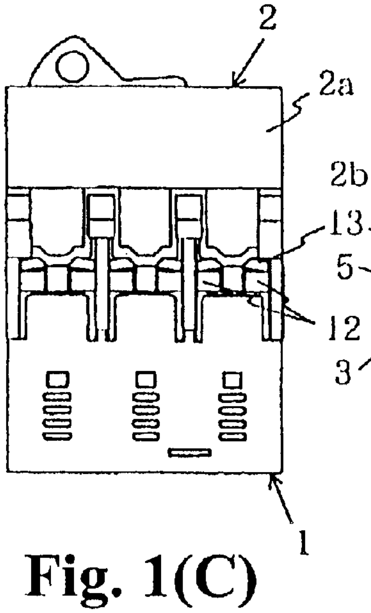
Fig. 1(C)
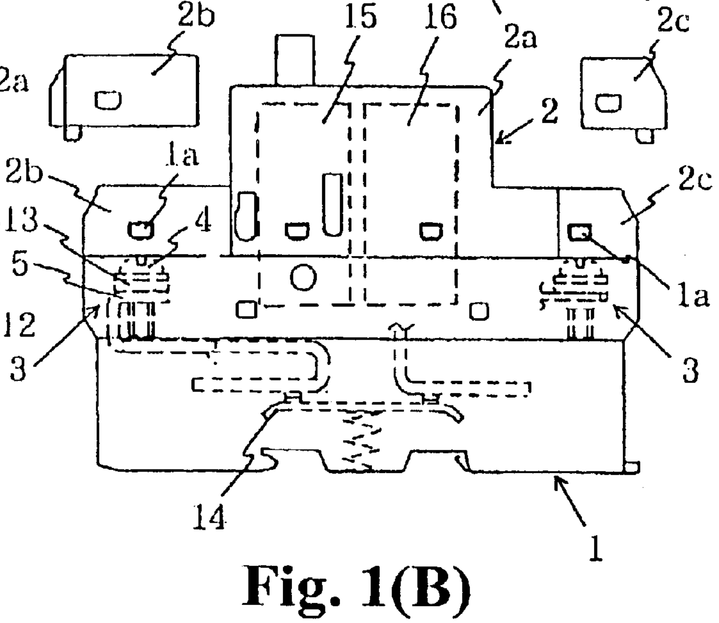
Fig. 1(B)

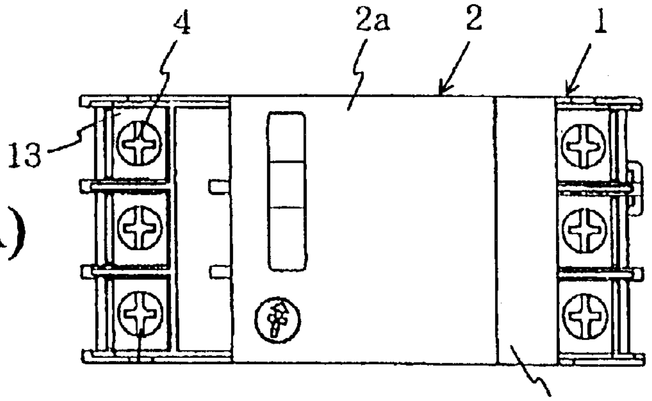
Fig. 2(A)
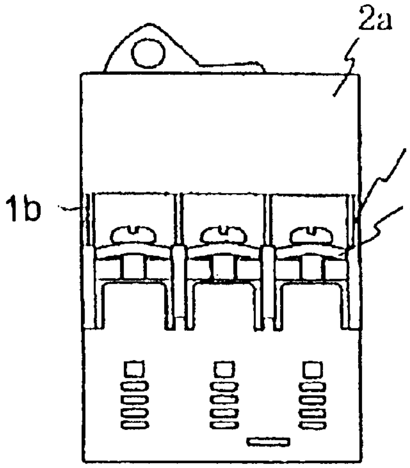
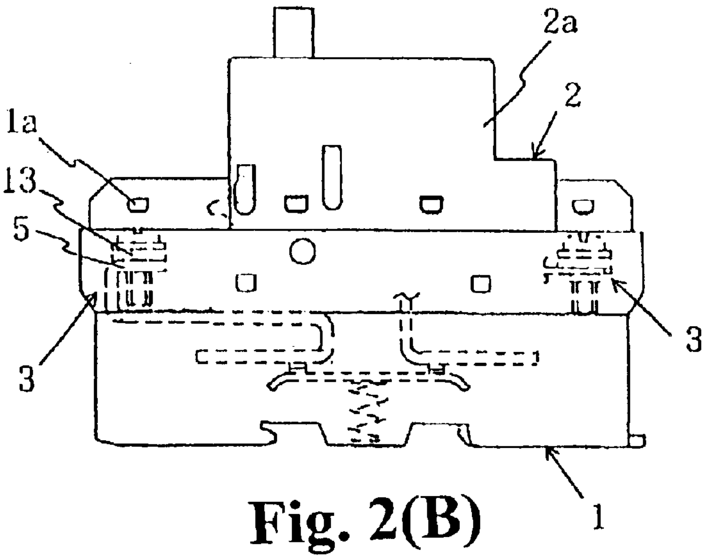
Fig. 2(C)
Fig. 2(B)
Fig. 3(A)
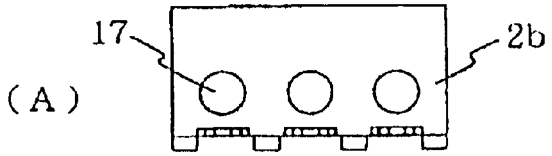
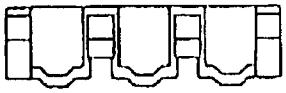
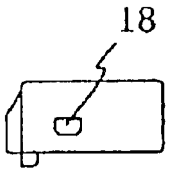
Fig. 3(B)
Fig. 3(C)

Fig. 5(A)
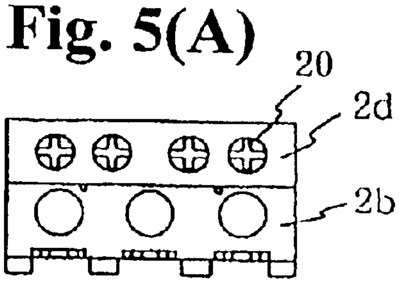
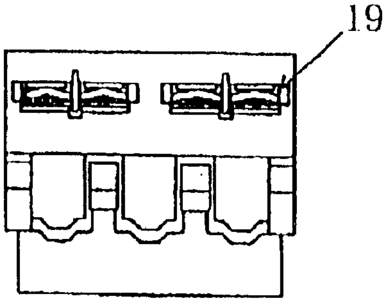
Fig. 5(B)
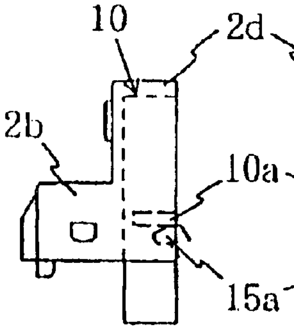
Fig. 5(C)
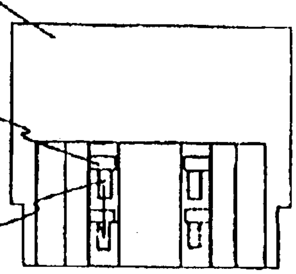
Fig. 5(D)
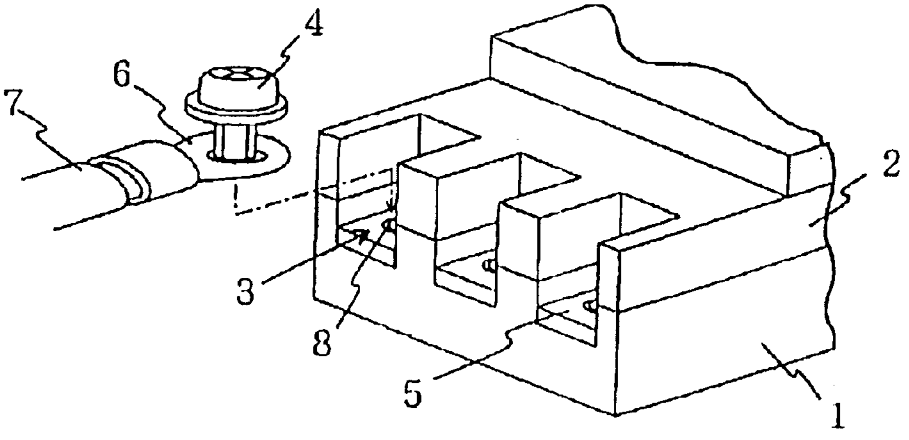
Fig. 6 Prior Art

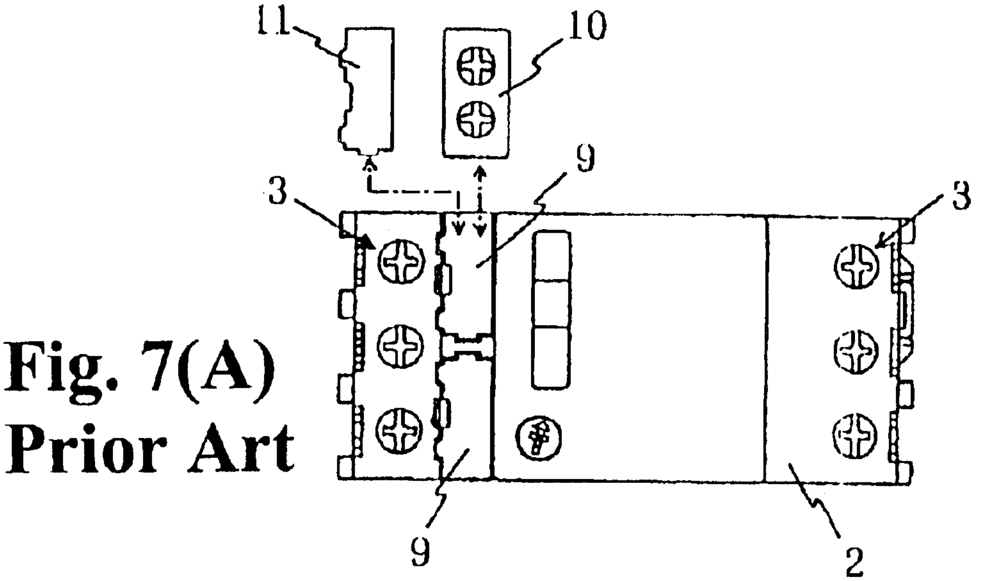
Fig. 7(A) Prior Art
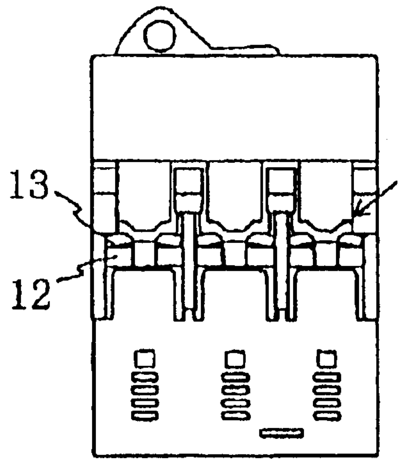
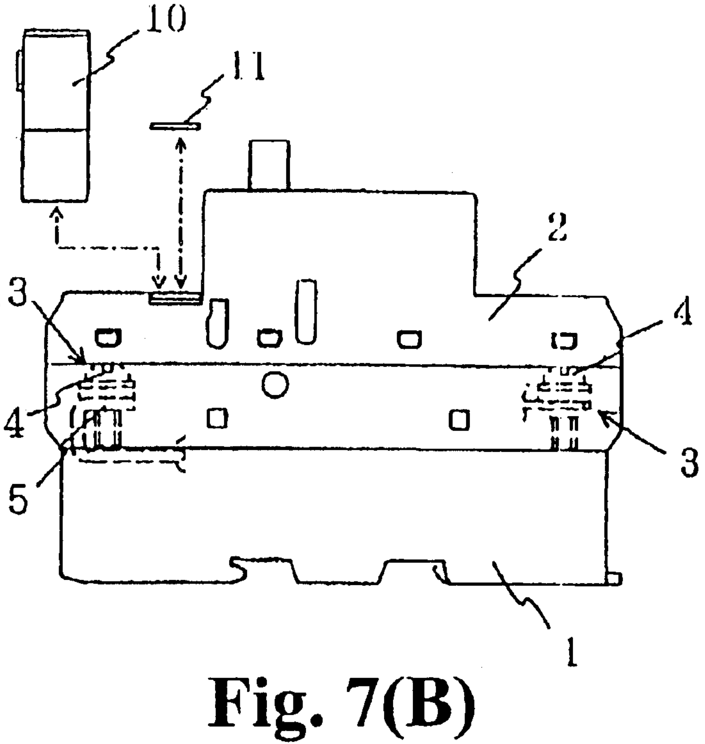
Fig. 7(C) Prior Art
Fig. 7(B) Prior Art

CIRCUIT BREAKER

BACKGROUND OF THE INVENTION AND RELATED ART STATEMENT

The present invention relates to a circuit breaker such as an integrated circuit breaker and a protective switch integrated in a molded case. More specifically, the present invention relates to a terminal cover of a low-voltage circuit breaker for covering a terminal part.

In a circuit breaker, an external wire is connected to a terminal part directly or with a ring type compression terminal lug or a rod type lug. FIG. 6 is a perspective view showing a three-pole circuit breaker in which a wire is connected via a ring type compression terminal lug at an end of the circuit breaker. In FIG. 6, terminals parts 3 are disposed at front and rear ends of a molded case comprised of a case 1 and a cover 2 (in FIG. 6, only an end of the terminal part 3 at a power supply side is shown). Each of the terminal parts 3 is provided with a terminal 5 for each pole and a terminal screw 4. When an electric wire 7 is connected to the terminal 5 via the ring type compression terminal lug 6, the terminal screw 4 is inserted through the ring type compression terminal lug 6 as shown in FIG. 6, and the terminal screw 4 is screwed into a screw hole 8.

In the circuit breaker with such a connection structure, an upper part of the terminal part 3 must be opened as shown in FIG. 6. Therefore, it is difficult to protect the connection part, or an energized part, of the terminal part 3 from contact. In case that it is necessary to protect the energized part from contact, an additional terminal cover may be attached to the circuit breaker, for example, as disclosed in Japanese Utility Model Publication (KOKAI) No. 57-167549.

FIGS. 7(A) to 7(C) illustrate a circuit breaker with terminal parts covered with a cover, wherein FIG. 7(A) is a plan view thereof, FIG. 7(B) is a side view thereof, and FIG. 7(C) is a front view showing the power supply side of the circuit breaker. In FIGS. 7(A)–7(B), terminal parts 3 to be connected to a power supply and a load are respectively disposed at front and rear ends of a case 1. A control mechanism section such as a switching mechanism for switching a movable contact (not shown) and an overcurrent tripping mechanism is provided between the front and rear terminal parts 3. In this circuit breaker, the terminal parts 3 are entirely covered with a cover 2. Therefore, it is not possible to connect an electric wire with the ring type compression terminal lug to the terminal part 3. Instead, an electric wire (not shown) is inserted into an electric wire inlet 12 formed at an end face of the case 1 (refer to FIG. 7(C)), and the terminal screw 4 directly fastens the wire to the terminal 5 via a washer 13. In this case, the cover 2 protects the energized part of the terminal part 3 from contact.

In order to transmit a switch signal, a trip signal, and the like from the circuit breaker to external apparatuses, an attachment such as an auxiliary contact device or an alarm contact device may be mounted on the circuit breaker. The attachment is mounted on the circuit breaker by the method shown in FIGS. 7(A)–7(C) or a method disclosed in Japanese Patent Publication (KOKAI) No. 07-169355. More specifically, at one side of the cover 2, i.e. on the power supply side, two openings 9 are formed at the right and left sides adjacent to the control mechanism section. An attachment 10 is attached to the opening to interconnect with the control mechanism section. In case that the attachment 10 is unnecessary, the openings 9 are closed with lids 11.

According to the conventional device described above, the energized part is exposed in the circuit breaker as shown in FIG. 6, in which a wire with the ring type compression terminal lug can be connected. Thus, it is necessary to attach the terminal cover to the circuit breaker in addition to the cover for covering the circuit breaker to protect the energized part from contact. In the circuit breaker shown in FIGS. 7(A)–7(C), in which the terminal parts are integrally covered with the covers, it is difficult to connect the wire with the ring type compression terminal lug to the terminal part. Further, in the circuit breaker shown in FIGS. 7(A)–7(C), in which the attachment is mounted on the cover, it is necessary to close the openings formed in the cover with the lids in the case where the attachment is unnecessary.

It is therefore an object of the present invention to provide a circuit breaker in which the electric wire with or without the ring type compression terminal lug can be connected.

Another object of the invention is to provide a circuit breaker which can cope with both cases that the energized parts are required to be protected from contact or not.

A further object of the invention is to provide a circuit breaker as stated above, wherein an attachment is also mounted on a cover.

Further objects and advantages of the invention will be apparent from the following description of the invention.

SUMMARY OF THE INVENTION

To accomplish the above objects, a circuit breaker includes a molded case comprised of a case and a cover. Terminal parts to be connected to a power supply and a load are provided respectively at front and rear ends of the molded case. A control mechanism for switching a movable contact is disposed between the front and rear terminal parts. The cover is divided into three parts for covering the control mechanism and the terminal parts disposed at front and rear of the control mechanism, respectively. The front and rear parts of the cover covering the terminal parts are detachably mounted on the molded case as terminal covers.

With this configuration, it is possible to connect an electric wire with a ring type compression terminal lug to the circuit breaker by removing the terminal covers, that is, portions of the three divided parts covering the terminal parts, from the case to open upper parts of the terminal parts. Also, in case that the terminal covers are attached to the circuit breaker, it is possible to protect the energized parts of the terminal parts from contact. Moreover, since the cover is divided, it is possible to eliminate additional terminal covers, lids, and the like, thereby making it easy to handle the cover.

It is preferred that an attachment including auxiliary contacts or alarm contacts is integrally formed at a control mechanism side of the terminal cover to interconnect with the control mechanism. With this configuration, it is possible to easily cope with both cases that an attachment is provided or not only by replacing the terminal covers. In case that the attachment is mounted on the circuit breaker, an electric wire with the ring type compression terminal lug can be connected to the circuit breaker by removing the terminal covers.

BRIEF DESCRIPTION OF THE DRAWINGS

FIGS. 1(A) to 1(C) are views showing a circuit breaker according to an embodiment of the present invention, wherein FIG. 1(A) is a plan view thereof, FIG. 1(B) is a side view thereof, and FIG. 1(C) is a front view thereof;

FIGS. 2(A) to 2(C) are views showing a state in which terminal covers in FIGS. 1(A)–1(C) are detached from the circuit breaker, wherein FIG. 2(A) is a plan view showing the circuit breaker, FIG. 2(B) is a side view thereof, and FIG. 2(C) is a front view thereof;

FIGS. 3(A) to 3(C) are views showing the terminal cover in FIGS. 1(A)–1(C), wherein FIG. 3(A) is a plan view thereof, FIG. 3(B) is a front view thereof, and FIG. 3(C) is a side view thereof;

FIGS. 4(A) to 4(C) are views showing a circuit breaker according to another embodiment of the present invention, wherein FIG. 4(A) is a plan view thereof, FIG. 4(B) is a side view thereof, and FIG. 4(C) is a front view thereof;

FIGS. 5(A) to 5(D) are views showing a terminal cover in FIG. 4, wherein FIG. 5(A) is a plan view thereof, FIG. 5(B) is a front view thereof, FIG. 5(C) is a side view thereof, and FIG. 5(D) is a rear view thereof;

FIG. 6 is a perspective view showing essential parts of a conventional circuit breaker; and FIGS. 7(A) to 7(C) are views showing another conventional circuit breaker, wherein FIG. 7(A) is a plan view thereof, FIG. 7(B) is a side view thereof, and FIG. 7(C) is a rear view thereof.

DETAILED DESCRIPTION OF PREFERRED EMBODIMENTS

Figure 4A:
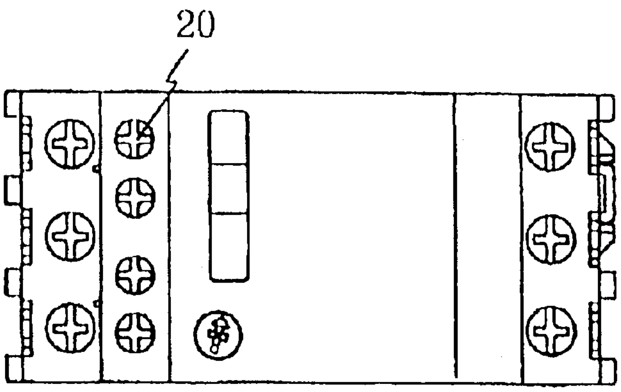

FIGS. 1(A) to 1(C) illustrate an embodiment of the present invention, wherein FIG. 1(A) is a plan view showing a three-pole circuit breaker, FIG. 1(B) is a side view thereof, and FIG. 1(C) is a front view showing a power supply side of the circuit breaker. As shown in FIGS. 1(A)–1(C), terminal parts 3 to be connected to a power supply and a load are disposed at front and rear ends of a case 1, respectively. A control mechanism section is comprised of a switching mechanism 15 for switching a movable contact 14 and an over-current tripping mechanism 16, and is disposed between the front and rear terminal parts 3. A cover 2 is divided into three parts 2*a*, 2*b*, and 2*c* to cover the control mechanism section and the front and rear terminal parts 3. The front part 2*a* and the rear part 2*b* are detachably mounted on the case 1 as terminal covers for covering the terminal parts 3.

FIGS. 3(A) to 3(C) illustrate the terminal cover 2*b* shown in FIGS. 1(A)–1(C), wherein FIG. 3(A) is a plan view thereof, FIG. 3(B) is a front view thereof, and FIG. 3(C) is a side view thereof. As shown in FIGS. 3(A)–3(C), terminal screw fastening holes 17 are formed in an upper surface of the terminal cover 2*b*, and engagement holes 18 for engaging the terminal cover 2*b* with the case 1 are formed in the side surfaces of the terminal cover 2*b*. As shown in FIGS. 1(A)–1(B), the terminal cover 2*b* engages engagement protrusions 1*a* at side walls 1*b* of the case 1 through the engagement holes 18 by a snap-fitting method so that the terminal cover 2*b* can be detachably mounted on the case 1 to cover the terminal part 3. The structure of the terminal cover 2*c* is identical with that of the terminal cover 2*b*.

In FIGS. 1(A)–1(C), when an electric wire (not shown) is connected to the circuit breaker directly or with a rod type lug, the electric wire is inserted into an electric wire inlet 12 formed on an end face of the case 1, and a terminal screw 4 fastens the wire to a terminal 5 via a washer 13. In this state, the energized parts of the terminal parts 3 are covered with the terminal covers 2*b* and 2*c* to be protected from contact by a finger or the like.

FIGS. 2(A)–2(C) show a state in which the terminal covers 2*b* and 2*c* are removed from the circuit breaker shown in FIGS. 1(A)–1(C). When an electric wire with a ring type compression terminal lug 6 (refer to FIG. 6) is connected to the circuit breaker, the terminal covers 2*b* and 2*c* are removed from the terminal parts 3 to open the upper parts of the terminal parts 3. The terminal covers 2*b* and 2*c* are attached to the circuit breaker again after the electric wire is connected to the circuit breaker, so that the energized parts, or connected parts, of the terminal part 3 can be protected from contact. In FIGS. 2(A)–2(C), it should be noted that surfaces of the case 1 and the cover 2*a* facing the terminal covers 2*b* and 2*c* are closed by walls to prevent dust and foreign materials from entering the case 1 when the terminal covers 2*b* and 2*c* are removed from the circuit breaker.

Figure 4C:
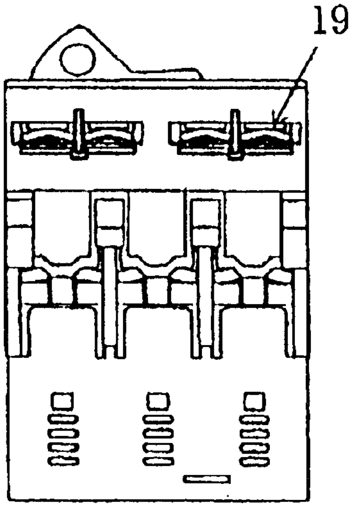
Figure 4B:
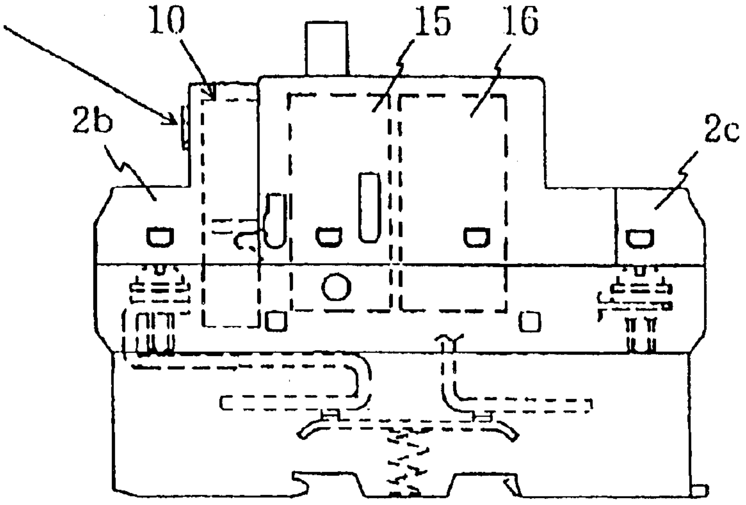

FIGS. 4(A)–4(C) illustrate the circuit breaker with an attachment integrated with the terminal cover 2*b*, and FIGS. 5(A)–5(D) illustrate the terminal cover 2*b*. In FIGS. 4(A)–4(C) and 5(A)–5(D), a case 2*d* for the attachment 10 is integrated with the control mechanism section side of the terminal cover 2*b*. Two pairs of auxiliary contacts (not shown) are incorporated at right and left sides of a portion where the case 2*d* is placed. Operation parts 10*a* for supporting the auxiliary contacts face the ends of actuators 15*a* for transmitting an operation of the switching mechanism 15. Terminal parts 19 of the attachment 10 face the front surface of the case 2*d*, and terminal screws 20 face the upper surface of the case 2*d*.

When the switching mechanism 15 opens to move edges of the actuators 15*a* to positions indicated by hidden lines in FIG. 5(D), the operation parts 10*a* of the attachment 10 lower in response to the movement of the actuators 15*a* to switch the auxiliary contacts (not shown), so that the attachment 10 as an auxiliary contact device transmits an OFF signal. In case that the attachment 10 is an alarm contact device, the operation parts 10*a* face actuators (not shown) of the over-current tripping mechanism 16. When an over-current occurs, the over-current tripping mechanism 16 operates to switch the alarm contacts to transmit a trip signal.

As described above, according to the present invention, the cover is divided into the three parts. The terminal covers for covering the terminal parts are detachably mounted on the case, so that the electric wire with the ring type compression terminal lug can be connected to the circuit breaker and the energized parts of the terminal parts are always protected from contact. Further, the circuit breaker is provided with the terminal cover integrated with the attachment, and it is therefore possible to cope with the both cases where the attachment is provided or not only by replacing the terminal covers.

While the invention has been explained with respect to the specific embodiments of the invention, the explanation is illustrative and the invention is limited only by the appended claims.

What is claimed is:

1. A circuit breaker comprising:

a control mechanism for the circuit breaker, a case member having two end portions provided with terminals and a middle portion for housing the control mechanism, a cover member attached to the case member and having a first cover for covering the middle portion of the case member and two second covers for covering the two end portions of the case member, said second covers being detachably attached to the case member, and an attachment integrally formed with at least one of the two second covers and having one of an auxiliary contact and an alarm contact, said one of the auxiliary contact and the alarm contact being arranged to interconnect with the control mechanism.

2. A circuit breaker according to claim 1, wherein each of said two second covers has first engaging portions at side surfaces thereof, and said case member has second engaging portions for engaging the first engaging portions.

3. A circuit breaker according to claim 1, wherein said control mechanism includes a switching mechanism with an actuator, and said attachment includes an operation part, said attachment being assembled with the control mechanism so that an operation of the switching mechanism is transmitted to the attachment mechanism through the actuator and the operation part.

4. A circuit breaker comprising, a control mechanism for the circuit breaker, a case member having two end portions provided with terminals and a middle portion for housing the control mechanism, and a cover member attached to the case member and having a first cover for covering the middle portion of the case member and two second covers for covering the two end portions of the case member, said second covers being detachably attached to the case member, each of said two second covers having first engaging portions at side surfaces thereof, wherein said case member includes two side walls having projections projecting outwardly therefrom as second engaging portions for engaging the first engaging portions, and each of said second covers has holes at the side surfaces as the first engaging portions.

5. A circuit breaker according to claim 4, wherein said side walls are located inwardly from outer surfaces of the case member so that when each of said second covers is attached to the case member, the outer surfaces of the case member are substantially flush with outer surfaces of the second covers.

6. A circuit breaker according to claim 5, wherein said two second covers have insertion holes at locations corresponding to the terminals for receiving wires.

* * * * *